US011754468B2

(12) United States Patent
Ishida

(10) Patent No.: US 11,754,468 B2
(45) Date of Patent: Sep. 12, 2023

(54) VIBRATION ANALYSIS APPARATUS AND VIBRATION ANALYSIS METHOD

(71) Applicant: Mitsubishi Electric Corporation, Tokyo (JP)

(72) Inventor: Tetsushi Ishida, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/798,318

(22) PCT Filed: May 19, 2020

(86) PCT No.: PCT/JP2020/019830
§ 371 (c)(1),
(2) Date: Aug. 9, 2022

(87) PCT Pub. No.: WO2021/234828
PCT Pub. Date: Nov. 25, 2021

(65) Prior Publication Data
US 2023/0097101 A1    Mar. 30, 2023

(51) Int. Cl.
G01M 13/028    (2019.01)
G01H 1/00    (2006.01)
G05B 19/4065    (2006.01)

(52) U.S. Cl.
CPC .......... *G01M 13/028* (2013.01); *G01H 1/003* (2013.01); *G05B 19/4065* (2013.01);
(Continued)

(58) Field of Classification Search
CPC . G01M 13/028; G01H 1/003; G05B 19/4065; G05B 2219/37435; G05B 2219/37534
See application file for complete search history.

(56) References Cited

U.S. PATENT DOCUMENTS

2006/0167659 A1*  7/2006  Miyasaka ............... F16C 19/52
                                                   702/185
2017/0108406 A1*  4/2017  Thomson ............ G01M 13/045
(Continued)

FOREIGN PATENT DOCUMENTS

JP    5-45210 A    2/1993
JP    5-72026 A    3/1993
(Continued)

OTHER PUBLICATIONS

International Search Report and Written Opinion dated Jun. 30, 2020, received for PCT Application PCT/JP2020/019830, filed on May 19, 2020, 8 pages including English Translation.
(Continued)

*Primary Examiner* — Manuel A Rivera Vargas
*Assistant Examiner* — Yaritza H Perez Bermudez
(74) *Attorney, Agent, or Firm* — XSENSUS LLP

(57) ABSTRACT

A vibration analysis apparatus includes: a storage unit storing a regression equation indicating correspondence between rotation speed change of a rotation mechanism and a peak occurrence frequency of acceleration of vibration, for each acceleration peak; an analysis unit extracting a peak occurrence frequency of acceleration of vibration for each acceleration peak, based on vibration data of the rotation mechanism and calculating, for each acceleration peak, a waveform area of the acceleration peak by integrating the acceleration peak over a specific frequency section; and an anomaly determination unit determining whether operational anomaly occurs in the rotation mechanism for each acceleration peak. The analysis unit tracks, in accordance with the regression equation, change in peak occurrence frequency due to rotation speed change when vibration of the rotation mechanism is analyzed, and calculates, for each second acceleration peak, the waveform area of the second
(Continued)

acceleration peak corresponding to the second vibration frequency tracked.

10 Claims, 7 Drawing Sheets

(52) U.S. Cl.
CPC .............. *G05B 2219/37435* (2013.01); *G05B 2219/37534* (2013.01)

(56) References Cited

U.S. PATENT DOCUMENTS

| | | | | |
|---|---|---|---|---|
| 2017/0343451 | A1* | 11/2017 | Yoshida | G01H 1/003 |
| 2018/0335366 | A1* | 11/2018 | Qiao | G01M 13/045 |
| 2018/0364132 | A1 | 12/2018 | Knaup | |
| 2019/0329610 | A1* | 10/2019 | Hubert | G01M 13/045 |
| 2020/0182684 | A1* | 6/2020 | Yoskovitz | G01V 3/081 |

FOREIGN PATENT DOCUMENTS

| | | |
|---|---|---|
| JP | 9-113416 A | 5/1997 |
| JP | 10-26580 A | 1/1998 |
| JP | 2002-22617 A | 1/2002 |
| JP | 2007-57326 A | 3/2007 |
| JP | 2018-40594 A | 3/2018 |
| JP | 2018040594 A * | 3/2018 |

OTHER PUBLICATIONS

Decision to Grant dated Oct. 13, 2020, received for JP Application 2020-545209, 5 pages including English Translation.

* cited by examiner

VIBRATION ANALYSIS APPARATUS AND VIBRATION ANALYSIS METHOD

CROSS-REFERENCE TO RELATED APPLICATION

The present application is based on PCT filing PCT/JP2020/019830, filed May 19, 2020, the entire contents of which are incorporated herein by reference.

FIELD

The present disclosure relates to a vibration analysis apparatus and a vibration analysis method for analyzing vibrations of a rotation mechanism.

BACKGROUND

Manufacturing apparatuses such as a motor winding machine include a rotation mechanism for rotating a rotation shaft such as a main shaft journaled in a bearing or the like. When an anomaly occurs due to a failure or the like, such a rotation mechanism shows signs of the anomaly such as vibrations during rotation of the rotation shaft. Thus, the occurrence of an anomaly is required to be detected correctly from the vibrations.

The rotation shaft apparatus disclosed in Patent Literature 1 measures vibrations of bearings while a main shaft is rotating and extracts a waveform in a specific frequency band corresponding to the rotation speed of the main shaft from the waveform of the vibrations measured. This rotation shaft apparatus performs a definite integral of the extracted waveform to calculate the area, and compares the calculated area with a threshold to determine the presence or absence of anomalies in the bearings.

CITATION LIST

Patent Literature

Patent Literature 1: Japanese Patent Application Laid-open No. 2018-40594

SUMMARY

Technical Problem

However, with the technology in Patent Literature 1 described above, the presence or absence of anomalies in the bearings can be determined only in the case where the rotation speed of the rotation shaft does not change; therefore, there is a problem in that the presence or absence of operational anomalies cannot be determined in the case of involving acceleration and deceleration of the rotation shaft.

The present disclosure has been achieved in view of the above and an object thereof is to provide a vibration analysis apparatus capable of detecting an operational anomaly of a rotation mechanism in which the rotation speed changes.

Solution to Problem

In order to solve the above problem and achieve the object, a vibration analysis apparatus according to the present disclosure includes a storage unit to store first correspondence information indicating a correspondence between a change in a first rotation speed of a rotation mechanism and a change in a first vibration frequency corresponding to a first acceleration peak of acceleration of vibration in the rotation mechanism, for each first acceleration peak. Moreover, the vibration analysis apparatus according to the present disclosure includes an analysis unit to extract a second vibration frequency corresponding to a second acceleration peak of acceleration of vibration for each second acceleration peak, on a basis of vibration data indicating vibration of the rotation mechanism when vibration of the rotation mechanism is analyzed, and to calculate, for each second acceleration peak, a waveform area that is an area of a waveform of the second acceleration peak by integrating the second acceleration peak over a specific frequency section. Moreover, the vibration analysis apparatus according to the present disclosure includes an anomaly determination unit to determine whether an operational anomaly occurs in the rotation mechanism for each second acceleration peak on a basis of the waveform area and a threshold for a corresponding second acceleration peak. The analysis unit specifies the first correspondence information corresponding to the second acceleration peak, tracks, in accordance with the first correspondence information specified, a change in the second vibration frequency due to a change in a second rotation speed when vibration of the rotation mechanism is analyzed, and calculates, for each second acceleration peak, the waveform area of the second acceleration peak corresponding to the second vibration frequency tracked.

Advantageous Effects of Invention

A vibration analysis apparatus according to the present disclosure produces an effect of being capable of detecting an operational anomaly of a rotation mechanism in which the rotation speed changes.

DESCRIPTION OF EMBODIMENTS

Hereinafter, a vibration analysis apparatus and a vibration analysis method according to embodiments of the present disclosure will be described in detail with reference to the drawings.

Embodiment

Figure 1:
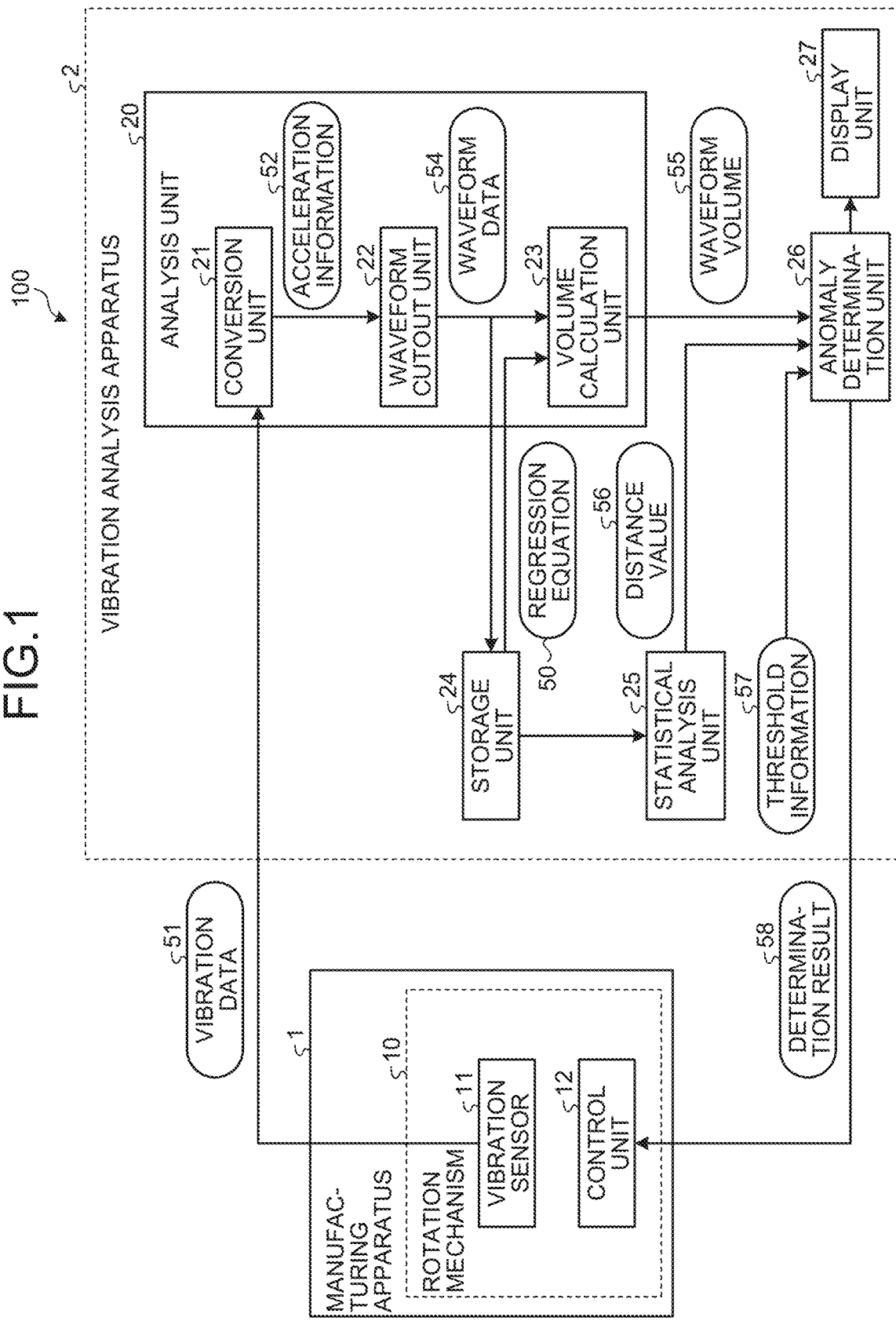
FIG. 1 is a block diagram illustrating a configuration of a vibration analysis system that includes a vibration analysis apparatus according to an embodiment.

FIG. 1 is a block diagram illustrating a configuration of a vibration analysis system that includes a vibration analysis apparatus according to an embodiment. A vibration analysis system 100 includes a manufacturing apparatus 1 and a vibration analysis apparatus 2.

The manufacturing apparatus 1 is an apparatus that includes a rotation mechanism 10 such as a servomotor and is, for example, a conveyor, a machine tool, or a motor winding machine. The manufacturing apparatus 1 outputs vibration data 51 that is analog data to the vibration analysis apparatus 2. The vibration data 51 is a signal indicating vibrations that have occurred in the rotation mechanism 10. The rotation mechanism 10 includes a rotation shaft, such as a main shaft, and a bearing that supports the rotation shaft.

The rotation mechanism 10 includes a vibration sensor 11 and a control unit 12. The vibration sensor 11 detects vibrations in the rotation mechanism 10 when the rotation mechanism 10 is operated and outputs the vibration data 51 indicating the vibrations to the vibration analysis apparatus 2.

The control unit 12 controls the operation of the rotation mechanism 10. The control unit 12 receives a determination result 58 of the operation of the rotation mechanism 10 from the vibration analysis apparatus 2. The control unit 12 changes or stops rotation command control of the rotation mechanism 10 on the basis of the determination result 58 of the operation. Upon receiving the determination result 58 indicating an operational anomaly of the rotation mechanism 10, the control unit 12 changes or stops the operation of the rotation mechanism 10.

The vibration analysis apparatus 2 is a computer that determines whether an operational anomaly has occurred in the rotation mechanism 10. The operational anomaly indicates vibrations of the rotation mechanism 10. The vibration analysis apparatus 2 analyzes the acceleration of the vibrations of the rotation mechanism 10 to determine whether the operational anomaly has occurred in the rotation mechanism 10.

The vibration analysis apparatus 2 analyzes the vibrations of the rotation mechanism 10 in which the rotation speed of the rotation shaft changes. Examples of the vibration analysis apparatus 2 include a programmable logic controller (PLC) and an industrial personal computer (IPC).

The vibration analysis apparatus 2 is loaded with a vibration analysis program for vibration analysis. The vibration analysis apparatus 2 determines the operation state of the rotation mechanism 10 by executing the vibration analysis program.

The vibration analysis program includes a program for calculating the correspondence between the frequency of vibrations and the acceleration of vibrations by performing fast Fourier transform (FFT) analysis on the vibration data 51.

Moreover, the vibration analysis program includes a program for searching for a peak of the acceleration (hereinafter, referred to as acceleration peak) and a program for cutting out a waveform in the frequency band including the acceleration peak.

Moreover, the vibration analysis program includes a program for tracking changes of an acceleration peak in accordance with a regression equation 50 that is information indicating how the peak occurrence frequency of an acceleration peak changes when the rotation speed of the rotation shaft changes.

Moreover, the vibration analysis program includes a program for calculating the area in the frequency band that is cut out and a program for calculating the volume of an acceleration peak by integrating the area in the cutout frequency band over a constant tracked period of time.

Moreover, the vibration analysis program includes a program for determining whether the operational anomaly has occurred in the rotation mechanism 10 by comparing the volume of an acceleration peak with a volume threshold. The volume threshold is stored in threshold information 57.

The vibration analysis apparatus 2 sends the determination result 58 of the operation to the control unit 12 and causes the control unit 12 to change or stop the operation of the rotation mechanism 10.

The vibration analysis apparatus 2 includes an analysis unit 20, a storage unit 24, a statistical analysis unit 25, an anomaly determination unit 26, and a display unit 27. The analysis unit 20 includes a conversion unit 21, a waveform cutout unit 22, and a volume calculation unit 23.

The conversion unit 21 collects the vibration data 51 from the vibration sensor 11 at specific intervals and performs FFT analysis on the collected vibration data 51. In the present embodiment, the conversion unit 21 performs FFT analysis on the vibration data 51 collected when operation including acceleration or deceleration of rotation is performed. In other words, the conversion unit 21 performs FFT analysis on acceleration data collected during operation in which the rotation speed fluctuates. The conversion unit 21 calculates the acceleration of vibrations at each frequency by performing FFT analysis on the vibration data 51.

The conversion unit 21 may calculate the acceleration at each frequency by discrete Fourier transform (DFT) analysis. The conversion unit 21 sends the calculated acceleration at each frequency to the waveform cutout unit 22 as acceleration information 52.

Figure 2:
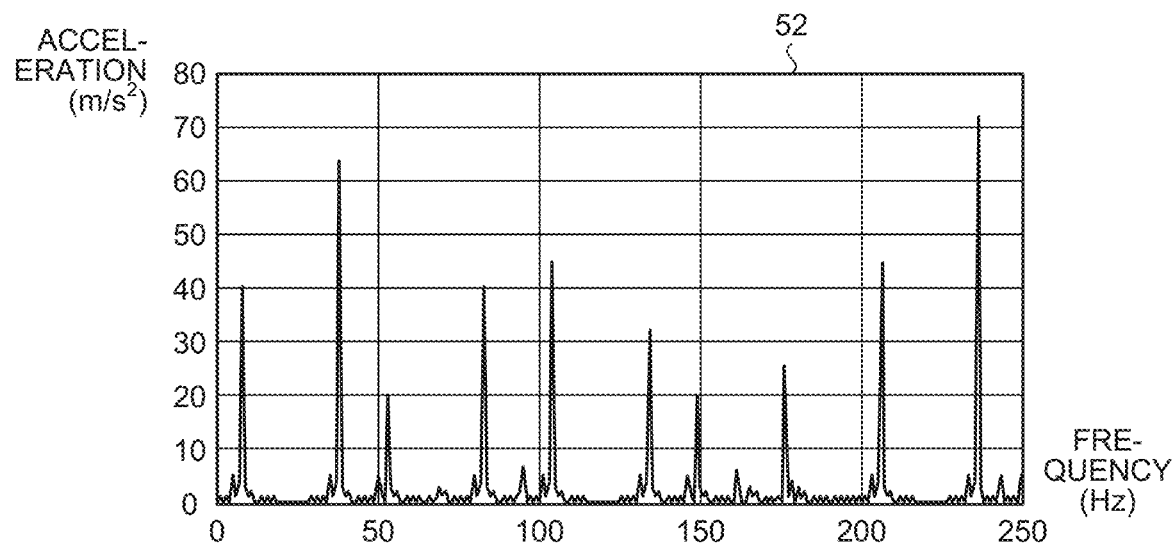
FIG. 2 is a graph illustrating acceleration information calculated by a conversion unit of the vibration analysis apparatus according to the embodiment.

The acceleration information will be explained. FIG. 2 is a graph illustrating the acceleration information calculated by the conversion unit of the vibration analysis apparatus according to the embodiment. In FIG. 2, the horizontal axis represents frequency of vibrations and the vertical axis represents acceleration of vibrations. The acceleration information 52 is information indicating acceleration at each frequency. The acceleration is large at specific frequencies as illustrated in FIG. 2.

The waveform cutout unit 22 extracts, from the acceleration information 52, the feature quantity resulting from the physical operation of the rotation mechanism 10. The waveform cutout unit 22 in this embodiment extracts, as the feature quantity, the frequency at which the acceleration exceeds a preset acceleration threshold.

Figure 3:
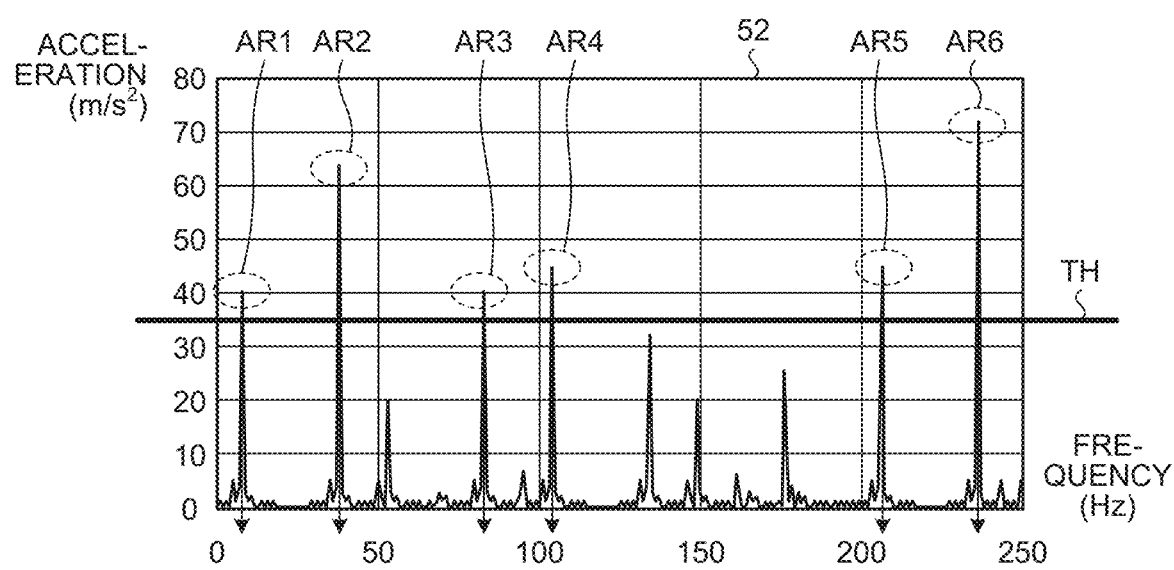
FIG. 3 is a graph for explaining the frequencies extracted by a waveform cutout unit of the vibration analysis apparatus according to the embodiment.

The acceleration threshold and the frequency extracted by the waveform cutout unit 22 will be explained. FIG. 3 is a graph for explaining the frequencies extracted by the waveform cutout unit of the vibration analysis apparatus according to the embodiment. In FIG. 3, the horizontal axis represents frequency of vibrations and the vertical axis represents acceleration of vibrations.

The waveform cutout unit 22 compares the acceleration information 52 with an acceleration threshold TH. The waveform cutout unit 22 extracts the frequency at which the corresponding acceleration exceeds the threshold TH among the frequencies. The waveform cutout unit 22 extracts a frequency band between the frequency at which the acceleration exceeds the threshold TH and the frequency at which the acceleration falls below the threshold TH, and extracts a median of this frequency band as the frequency of the N-th (N is a natural number) acceleration peak. The waveform cutout unit 22 stores the frequency of each acceleration peak extracted in the storage unit 24. FIG. 3 illustrates a case where the waveform cutout unit 22 extracts acceleration peaks AR1 to AR6 as acceleration peaks. In the following description, the frequency of an acceleration peak is in some cases referred to as peak occurrence frequency.

The waveform cutout unit 22 calculates the area of a waveform in a frequency band of a specific range including the extracted peak occurrence frequency. The waveform cutout unit 22 defines the extracted peak occurrence frequency as a median, sets the frequency band including regions before and after this median, and generates waveform data 54 that is data of the waveform in the frequency band. This waveform data 54 includes the peak occurrence frequency that is the frequency of the median and data of the area of the waveform in the frequency band. The waveform cutout unit 22, for example, calculates the area of the waveform in the frequency band within ±f of the median, where f is, for example, from a few Hz to a few hundred Hz.

The waveform cutout unit 22 calculates the waveform data 54 for each acceleration peak extracted and assigns a monitoring number to the waveform data 54 in ascending order of the peak occurrence frequency. The waveform cutout unit 22 stores the waveform data 54 that is assigned the monitoring number in the storage unit 24. Moreover, the waveform cutout unit 22 sends the waveform data 54 that is assigned the monitoring number to the volume calculation unit 23.

Figure 4:
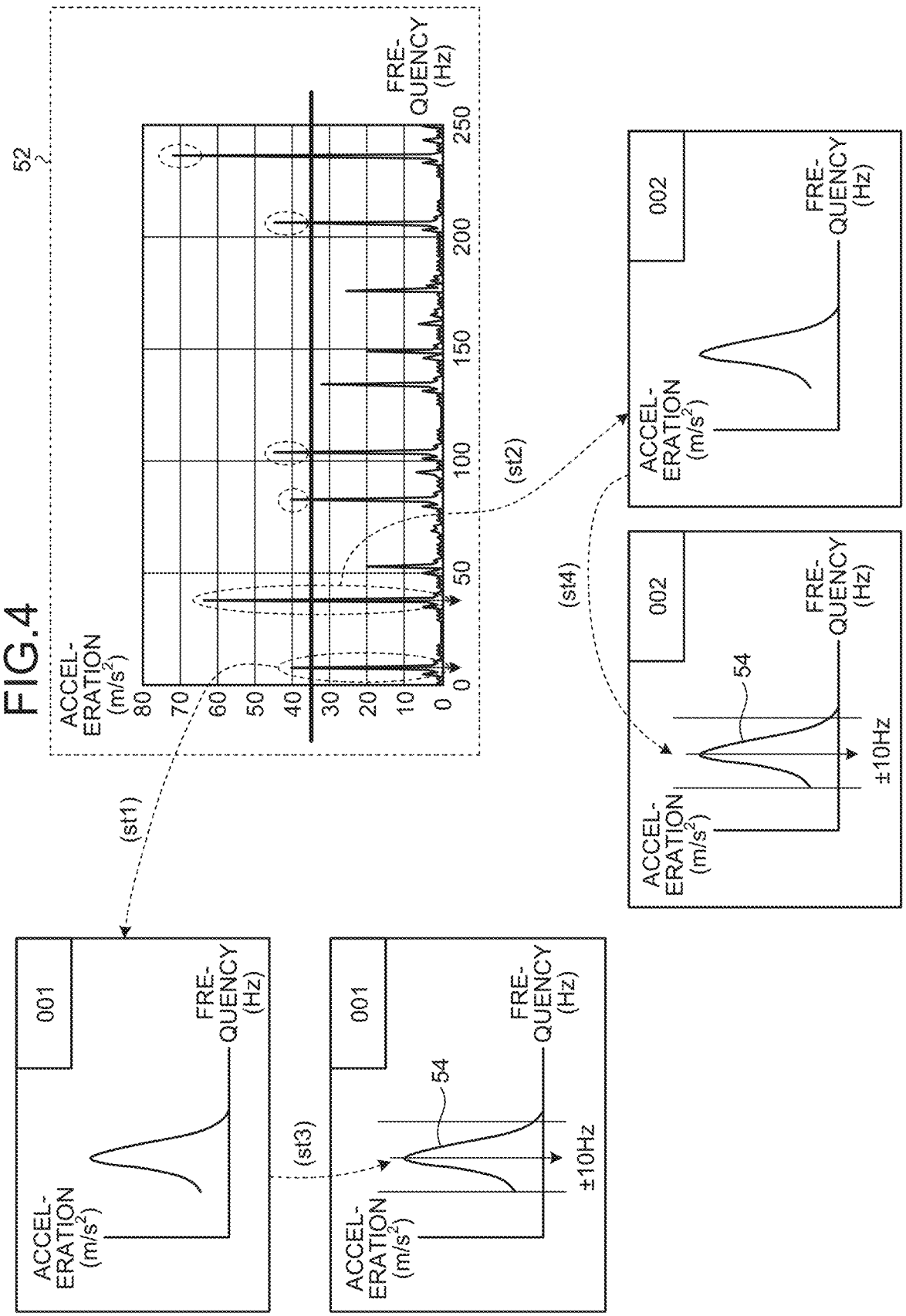
FIG. 4 is a diagram for explaining waveform data calculated by the waveform cutout unit of the vibration analysis apparatus according to the embodiment.

FIG. 4 is a diagram for explaining the waveform data calculated by the waveform cutout unit of the vibration analysis apparatus according to the embodiment. Here, a description will be given of a process in a case where the waveform cutout unit 22 calculates the waveform data 54 for the acceleration peaks AR1 and AR2. The waveform cutout unit 22 extracts the acceleration peak AR1 with the monitoring number 001 from the acceleration information 52 (st1) and extracts the acceleration peak AR2 with the monitoring number 002 from the acceleration information 52 (st2).

The waveform cutout unit 22 defines the peak occurrence frequency of the acceleration peak AR1 as a median, sets the frequency band within ±10 Hz of this median, and calculates the waveform data 54 in this frequency band (st3). In a similar manner, the waveform cutout unit 22 defines the peak occurrence frequency of the acceleration peak AR2 as a median, sets the frequency band within ±10 Hz of this median, and calculates the waveform data 54 in this frequency band (st4).

The waveform cutout unit 22 stores the waveform data 54 of the acceleration peak AR1 in the storage unit 24. Moreover, the waveform cutout unit 22 stores the waveform data 54 of the acceleration peak AR2 in the storage unit 24. Moreover, by performing a process similar to the process explained in FIG. 4, the waveform cutout unit 22 also calculates the waveform data 54 for the acceleration peaks AR3 to AR6 and stores the calculated waveform data 54 in the storage unit 24.

In the rotation mechanism 10, the peak occurrence frequency of an acceleration peak shifts when the rotation speed, i.e., the number of rotations, of the rotation shaft changes. For example, in a case where the acceleration of vibrations includes the acceleration peaks AR1 to AR6 illustrated in FIG. 3, when acceleration or deceleration of rotation occurs, the acceleration peaks AR1 to AR6 shift to acceleration peaks at the frequencies different from the frequencies illustrated in FIG. 3. In other words, the peak occurrence frequencies of the acceleration peaks AR1 to AR6 each change variously with a change in the number of rotations. This change varies between the acceleration peaks AR1 to AR6. In the present embodiment, the vibration analysis apparatus 2 analyzes vibrations of the rotation shaft on the basis of this change.

Figure 5:
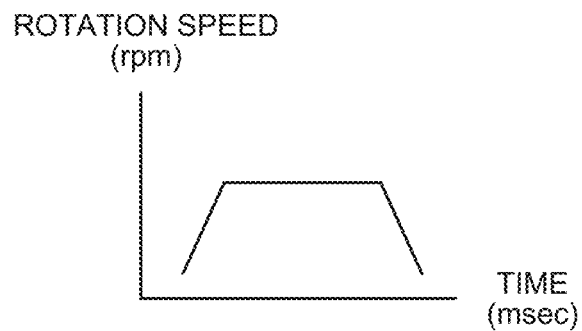
FIG. 5 is a graph illustrating an example of the rotation speed of a rotation shaft used in the vibration analysis system according to the embodiment.

FIG. 5 is a graph illustrating an example of the rotation speed of the rotation shaft used in the vibration analysis system according to the embodiment. In FIG. 5, the horizontal axis represents time and the vertical axis represents rotation speed. In the vibration analysis system 100, the rotation speed increases when machining of a workpiece is started and the rotation speed decreases when machining of a workpiece is finished. Specifically, the rotation mechanism 10 gradually increases the rotation speed at a specific rate when machining is started, maintains the rotation speed when the rotation speed has reached a specific speed, and gradually reduces the rotation speed at a specific rate after a lapse of a specific period of time to end the machining.

In the present embodiment, information on the shift of the peak occurrence frequency that occurs when the number of rotations changes is prepared in advance. The information indicating the shift of the peak occurrence frequency is correspondence information indicating a correspondence between the number of rotations and the peak occurrence frequency that is the feature quantity, i.e. the regression equation 50. The vibration analysis apparatus 2 determines whether the operational anomaly has occurred in the rotation mechanism 10 by using the regression equation 50.

The regression equation 50 is calculated based on the result of FFT analysis in the case where the number of rotations changes. The user may calculate the regression equation 50 using the vibration analysis apparatus 2, or the vibration analysis apparatus 2 may calculate the regression equation 50. Alternatively, the user may calculate the regression equation 50 using an apparatus other than the vibration analysis apparatus 2. A description will hereinafter be given of a case where the user calculates the regression equation 50 using the vibration analysis apparatus 2.

Figure 6:
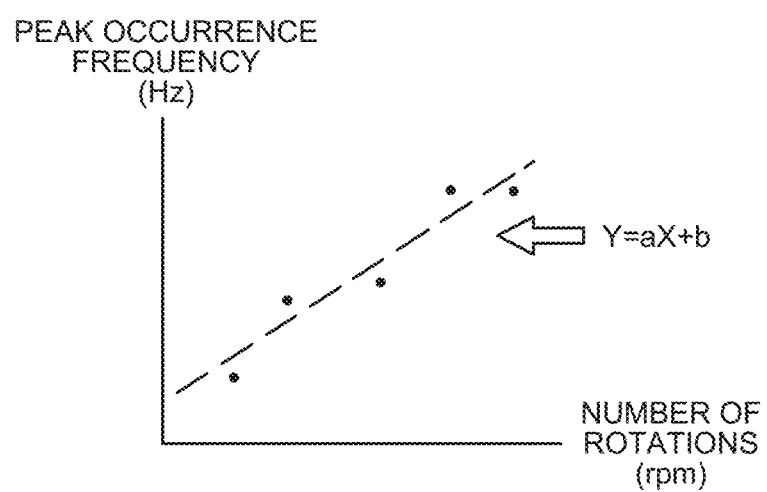
FIG. 6 is a graph for explaining a regression equation used by the vibration analysis apparatus according to the embodiment.

To calculate the regression equation 50, for example, the relation between the number of rotations and the peak occurrence frequency is graphically plotted and the regression equation 50 corresponding to the graph is calculated. FIG. 6 is a graph for explaining the regression equation used by the vibration analysis apparatus according to the embodiment. In FIG. 6, the horizontal axis represents the number of rotations and the vertical axis represents peak occurrence frequency.

The regression equation 50 (regression line) of the peak occurrence frequency on the number of rotations is calculated based on the relation between various number of rotations and the peak occurrence frequencies corresponding to the various number of rotations. The peak occurrence frequency is calculated, for example, by the waveform cutout unit 22. The regression equation 50 is calculated for each acceleration peak. The regression equation 50 is, for example, represented by a linear equation of the form $Y=aX+b$, where Y represents the peak occurrence frequency and X represents the number of rotations. As described above, the regression equation 50 is an equation that represents the correspondence between the number of rotations and the peak occurrence frequency. Accordingly, even if the number of rotations changes, that is, the rotation accelerates or decelerates, the vibration analysis apparatus 2 can still check the peak occurrence frequency corresponding to the number of rotations on the basis of the regression equation 50. The regression equation 50 may be calculated without creating a graph representing the relation between the number of rotations and the peak occurrence frequency.

To calculate the regression equation 50, the vibration analysis apparatus 2 performs a process similar to the process explained with reference to FIG. 2 to FIG. 4. Specifically, the conversion unit 21 calculates the acceleration of vibrations at each frequency by performing FFT analysis on the vibration data 51. Consequently, the conversion unit 21 calculates acceleration information such as the acceleration information 52. The waveform cutout unit 22 extracts an acceleration peak, such as the acceleration peaks AR1 to AR6, from the acceleration information calculated by the conversion unit 21, defines the extracted peak occurrence frequency as a median, and sets the frequency band including regions before and after this median. The user calculates the regression equation 50 on the basis of the frequency band set by the waveform cutout unit 22.

As described above, the regression equation 50 is calculated based on the frequency band including an acceleration peak; therefore, even if the theoretical frequency at which a characteristic acceleration peak predicted by Y=aX+b occurs fluctuates due to the fluctuations (physical fluctuations) in the number of rotations, the characteristic acceleration peak can be tracked. In other words, the frequency band is set as a fluctuation width for peak search by providing, for example, a few Hz before and after an acceleration peak, and the regression equation 50 corresponding to this frequency band is calculated. Consequently, even if an error occurs in the peak occurrence frequency corresponding to an acceleration peak, the vibration analysis apparatus 2 can still track the characteristic acceleration peak in accordance with the regression equation 50.

The rotation speed of the rotation mechanism 10 when the regression equation 50 is calculated is a first rotation speed, and the rotation speed of the rotation mechanism 10 when vibrations of the rotation mechanism 10 are analyzed is a second rotation speed. An acceleration peak when the regression equation 50 is calculated is a first acceleration peak, and the peak occurrence frequency corresponding to the first acceleration peak is a first vibration frequency. An acceleration peak when vibrations of the rotation mechanism 10 are analyzed is a second acceleration peak, and the peak occurrence frequency corresponding to the second acceleration peak is a second vibration frequency.

The storage unit 24 stores the regression equation 50 associated with the peak occurrence frequency. Moreover, when the operation of the rotation mechanism 10 is determined, the storage unit 24 stores the waveform data 54 that is assigned the monitoring number. The acceleration information 52 changes over time; therefore the storage unit 24 stores the acceleration information 52 at each time.

The volume calculation unit 23 determines which regression equation 50 the waveform data 54 with each monitoring number corresponds to. In other words, the volume calculation unit 23 specifies the regression equation 50 indicating the peak occurrence frequency corresponding to the acceleration peak of the waveform data 54. The volume calculation unit 23, for example, assumes that the number of rotations (rpm: rotations per minute) in the waveform data 54 with the monitoring number X1 is R immediately after the start of machining, and the peak occurrence frequency at this point in time is F1 Hz. In this case, the volume calculation unit 23 sets, for the waveform data 54 with the monitoring number X1, the regression equation 50 in which the peak occurrence frequency is F1 Hz when the number of rotations is R. Thus, the volume calculation unit 23 associates the waveform data 54 with the regression equation 50.

The peak occurrence frequency changes in accordance with the number of rotations. Because the peak occurrence frequency changes as represented by the regression equation 50, the volume calculation unit 23 checks which acceleration peak changes in accordance with which regression equation 50. The volume calculation unit 23 tracks each acceleration peak along the regression equation 50.

The volume calculation unit 23 integrates the area in the cutout frequency band over time from the start of machining to the end of machining (machining time) to thereby calculate the volume of the waveform (hereinafter, referred to as waveform volume 55) in the cutout frequency band. In other words, the volume calculation unit 23 calculates the waveform volume 55 in the frequency band of an acceleration peak.

Figure 7:
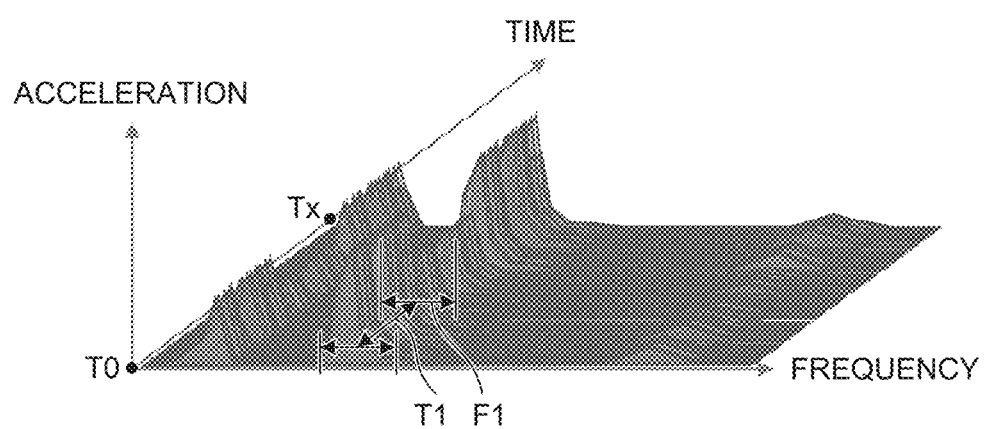
FIG. 7 is a graph for explaining the process of calculating the waveform volume by a volume calculation unit of the vibration analysis apparatus according to the embodiment.

FIG. 7 is a graph for explaining the process of calculating the waveform volume by the volume calculation unit of the vibration analysis apparatus according to the embodiment. The volume calculation unit 23 calculates the waveform volume 55 of the waveform data 54 with a specific monitoring number by integrating the waveform data 54 over a specific period of time. For example, the volume calculation unit 23 calculates the waveform volume 55 with the monitoring number X1 by integrating the waveform data 54 with the monitoring number X1 over a period of time T1.

The volume calculation unit 23 repeats such a process from time T0 that is the machining start time to time Tx that is the machining end time to calculate the waveform volume 55 with the monitoring number X1 in a period of time from the start of machining to the end of machining. Moreover, the volume calculation unit 23 calculates the waveform volume 55 in a period of time from the start of machining to the end of machining for the waveform data 54 with the other monitoring numbers. In other words, the volume calculation unit 23 calculates the waveform volume 55 for each monitoring number.

The volume calculation unit 23 may calculate the average value of the area (hereinafter, referred to as area average value) of waveforms in the frequency band that is cut out, on the basis of the waveforms in the frequency band that is cut out. When there are N waveforms in the frequency band cut out from the time T0 to the time Tx, the volume calculation unit 23 calculates the area average value by dividing the total area of the N waveforms in the cutout frequency band by N. In this case as well, the volume calculation unit 23 calculates the area average value for each monitoring number. The volume calculation unit 23 calculates at least one of the waveform volume 55 or the average area. A case where the volume calculation unit 23 calculates the waveform volume 55 will be described below.

The statistical analysis unit 25 calculates the degree of deviation of the feature quantity of a diagnostic target from a normal condition as a distance value 56 by a statistical diagnosis method such as an MT method or a principal component analysis method. Specifically, the statistical analysis unit 25 calculates the degree of deviation of the feature quantity of a diagnostic target from a normal condition as the distance value 56 on the basis of the feature quantity collected a plurality of times when the manufacturing apparatus 1 is in a normal condition (feature quantity in a normal condition) and the feature quantity of the diagnostic target. In other words, the statistical analysis unit 25 calculates the distance value 56 on the basis of the principal component obtained from the feature quantity when the manufacturing apparatus 1 is in a normal condition. The statistical analysis unit 25 calculates the distance value 56 for each monitoring number.

The feature quantity is information on the area of a waveform in the frequency band that is cut out. The feature quantity is, for example, the waveform volume 55 or the area average value. The statistical analysis unit 25 may calculate the distance value 56 at specific time intervals or may calculate the distance value 56 for the entire period of time from the start of machining to the end of machining. The statistical analysis unit 25 sends the calculated distance value 56 to the anomaly determination unit 26.

The anomaly determination unit 26 determines whether the operational anomaly has occurred in the rotation mechanism 10 on the basis of the waveform data 54. Because the number of rotations changes over time after the start of machining, the anomaly determination unit 26 determines the operation of the rotation mechanism 10 at each time by comparing an acceleration peak at each time and the allowable range of the acceleration peak at corresponding time. The allowable range of an acceleration peak is defined by the upper limit value and the lower limit value of the acceleration peak. The upper limit value and the lower limit value of an acceleration peak are stored in the threshold information 57. When an acceleration peak exceeds the allowable range, the anomaly determination unit 26 determines that the operational anomaly has occurred in the rotation mechanism 10. The threshold information 57 may be stored in the storage unit 24 or may be stored in a storage area other than the storage unit 24.

Moreover, the anomaly determination unit 26 determines whether the operational anomaly has occurred in the rotation mechanism 10 on the basis of the waveform volume 55. The anomaly determination unit 26 compares the waveform volume 55 in a specific period of time and the allowable range of the waveform volume 55 in this specific period of time, and determines the operation of the rotation mechanism 10 in the specific period of time on the basis of the result of comparison. An example of the specific period of time is the period of time T1. The allowable range of the waveform volume 55 is defined by the upper limit value and the lower limit value of the waveform volume 55. The upper limit value and the lower limit value of the waveform volume 55 are stored in the threshold information 57. When the waveform volume 55 exceeds the allowable range, the anomaly determination unit 26 determines that the operational anomaly has occurred in the rotation mechanism 10. The anomaly determination unit 26 may compare the area average value in a specific period of time and the allowable range of the area average value in this specific period of time, and determine the operation of the rotation mechanism 10 in the specific period of time on the basis of the result of comparison.

The anomaly determination unit 26 determines whether the operational anomaly has occurred in the rotation mechanism 10 for the entire period of time from the start of machining to the end of machining. In other words, the anomaly determination unit 26 determines whether an acceleration peak exceeds the allowable range for the period of time from the start of machining to the end of machining. Moreover, the anomaly determination unit 26 determines whether the waveform volume 55 exceeds the allowable range for the period of time from the start of machining to the end of machining. Moreover, the anomaly determination unit 26 determines whether the operational anomaly has occurred in the rotation mechanism 10 for all pieces of the waveform data 54 that are assigned the monitoring numbers.

Moreover, the anomaly determination unit 26 determines whether the operational anomaly has occurred in the rotation mechanism 10 on the basis of the distance value 56. When the distance value 56 exceeds the distance threshold, the anomaly determination unit 26 determines that the operational anomaly has occurred in the rotation mechanism 10. The anomaly determination unit 26 may determine whether the operational anomaly has occurred in the rotation mechanism 10 on the basis of the distance value 56 at specific time intervals or may determine whether the operational anomaly has occurred in the rotation mechanism 10 on the basis of the distance value 56 for the entire period of time from the start of machining to the end of machining. The distance threshold is stored in the threshold information 57.

When the operational anomaly has occurred in the rotation mechanism 10, the anomaly determination unit 26 sends the determination result 58 indicating that the operational anomaly has occurred in the rotation mechanism 10 to the control unit 12. Consequently, the anomaly determination unit 26 causes the control unit 12 to change or stop the operation of the rotation mechanism 10.

The storage unit 24 may store transitions of the acceleration peak, the area in the frequency band that is cut out, the waveform volume 55, or the area average value for each monitoring number, and monitor a change in trend over a long period of time.

The display unit 27 displays the acceleration peak, the regression equation 50, the vibration data 51, the acceleration information 52, the waveform data 54, the waveform volume 55, the distance value 56, the threshold information 57, the determination result 58, the area average value, and the like. The display unit 27 may be disposed external to the vibration analysis apparatus 2.

Figure 8:
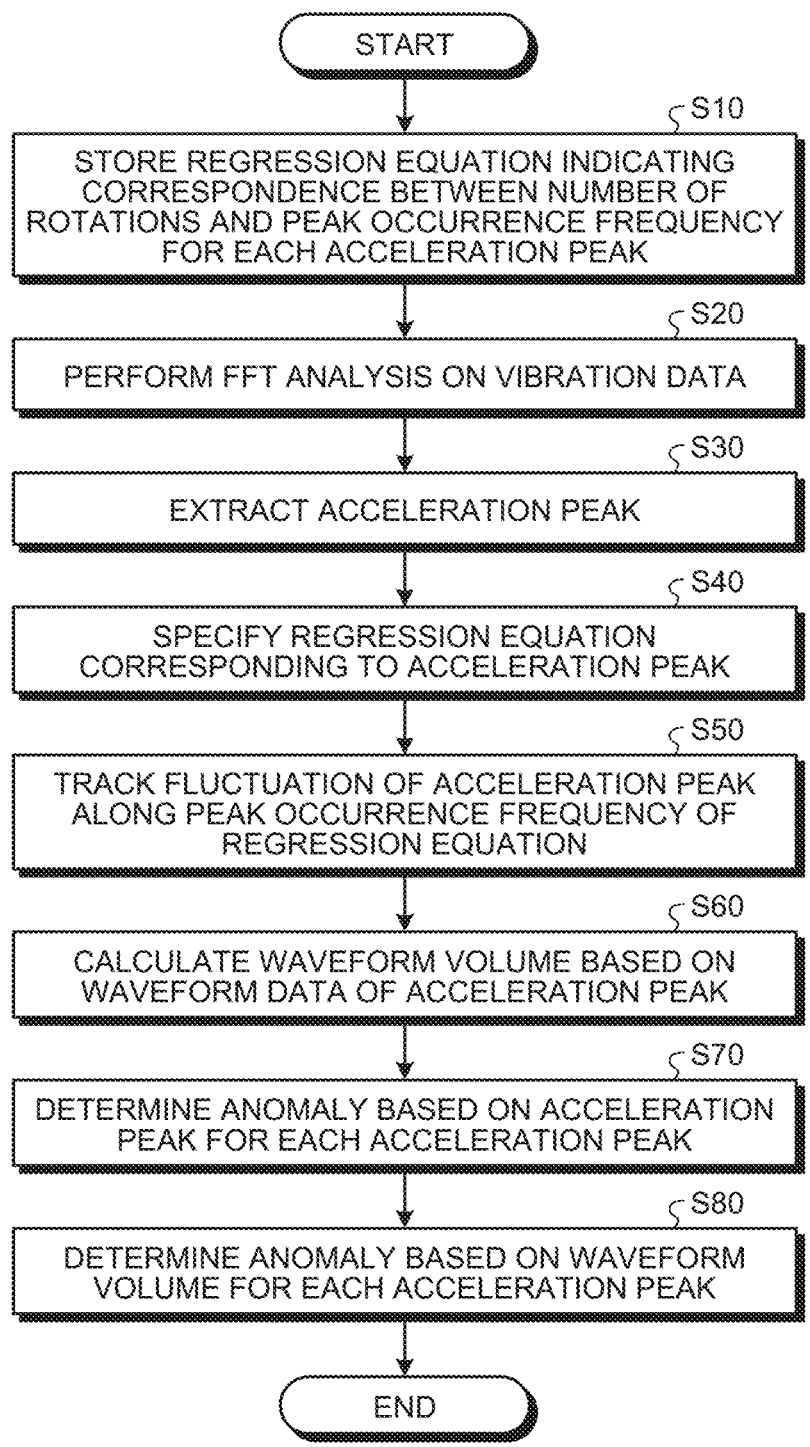
FIG. 8 is a flowchart illustrating a processing procedure for vibration analysis performed by the vibration analysis apparatus according to the embodiment.

FIG. 8 is a flowchart illustrating a processing procedure for vibration analysis performed by the vibration analysis apparatus according to the embodiment. The storage unit 24 of the vibration analysis apparatus 2 stores in advance the regression equation 50 indicating the correspondence between the number of rotations and the peak occurrence frequency for each acceleration peak (step S10). The regression equation 50 is first correspondence information.

The conversion unit 21 of the vibration analysis apparatus 2 obtains the vibration data 51 from the vibration sensor 11 and performs FFT analysis on the vibration data 51 (step S20). The conversion unit 21 of the vibration analysis apparatus 2 calculates the acceleration information 52 by performing FFT analysis on the vibration data 51. The acceleration information 52 is second correspondence information.

The waveform cutout unit 22 extracts an acceleration peak from the acceleration information 52 (step S30) and generates the waveform data 54 of the acceleration peak. Moreover, the volume calculation unit 23 specifies the regression equation 50 corresponding to the acceleration peak (step S40).

The volume calculation unit 23 tracks fluctuations of the acceleration peak for each acceleration peak along the peak occurrence frequency of the regression equation 50 (step S50). The volume calculation unit 23 calculates the waveform volume 55 on the basis of the waveform data 54 of the acceleration peak (step S60).

The anomaly determination unit 26 determines an anomaly on the basis of the acceleration peak for each acceleration peak (step S70). Moreover, the anomaly determination unit 26 determines an anomaly on the basis of the waveform volume 55 for each acceleration peak (step S80). The anomaly determination unit 26 performs anomaly determination based on an acceleration peak and anomaly determination based on the waveform volume 55 by performing a process similar to the process explained in FIG. 7.

The anomaly determination unit 26 performs determination as to whether the waveform volume 55 exceeds the allowable range as the anomaly determination based on the waveform volume 55. Moreover, the anomaly determination unit 26 performs determination as to whether the distance value 56 that is the degree of deviation of the waveform volume 55 from a normal condition exceeds the distance threshold as the anomaly determination based on the waveform volume 55. The anomaly determination unit 26 determines whether the operational anomaly has occurred in the rotation mechanism 10 for all pieces of the waveform data 54 that are assigned the monitoring numbers.

The anomaly determination unit 26 may perform any of the processes in step S70 and in step S80 first. Moreover, the anomaly determination unit 26 may perform only one of the processes in step S70 and in step S80.

Moreover, the anomaly determination unit 26 may perform any of the anomaly determination process based on the waveform volume 55 and the anomaly determination process based on the distance value 56 first in the process in step S80. Moreover, the anomaly determination unit 26 may perform only one of the anomaly determination process based on the waveform volume 55 and the anomaly determination process based on the distance value 56 in the process in step S80.

There is a wavelet method as a diagnostic method in the case where the peak occurrence frequency changes with a change in the rotation speed. However, when the acceleration, the frequency, and the elapsed time are represented by 3D data, the size of data used for diagnosis increases; therefore, in an embedded system, a memory shortage will occur and thus a device that performs a wavelet method cannot be implemented. Moreover, even when a system with a mass memory is used, the anomaly diagnosis process may take time, which may cause a delay in the determination as to whether the operational anomaly has occurred.

In contrast, the vibration analysis apparatus 2 according to the present embodiment tracks an acceleration peak in accordance with the regression equation 50; therefore, even when the rotation speed changes, only a small data size is used for performing the anomaly diagnosis for each acceleration peak.

That is, although a peak occurrence frequency at which an acceleration peak occurs shifts in the case where the number of rotations fluctuates, the vibration analysis apparatus 2 performs frequency tracking of the acceleration peak in accordance with a change in speed using the regression equation 50. Consequently, even when the number of rotations fluctuates, the vibration analysis apparatus 2 can still easily perform the anomaly diagnosis for each acceleration peak. Moreover, even when, for example, a manufacture is carried in while the speed is changing and thus a different vibration component is generated, the vibration analysis apparatus 2 can still find a new acceleration peak not associated with the monitoring number. Thus, even when a mechanical mechanism (such as a structure of the manufacturing apparatus 1) of a diagnostic target facility is unknown and the rotation mechanism 10 performs acceleration and deceleration, the vibration analysis apparatus 2 can still analyze anomalous vibrations of the rotation mechanism 10.

Figure 9:
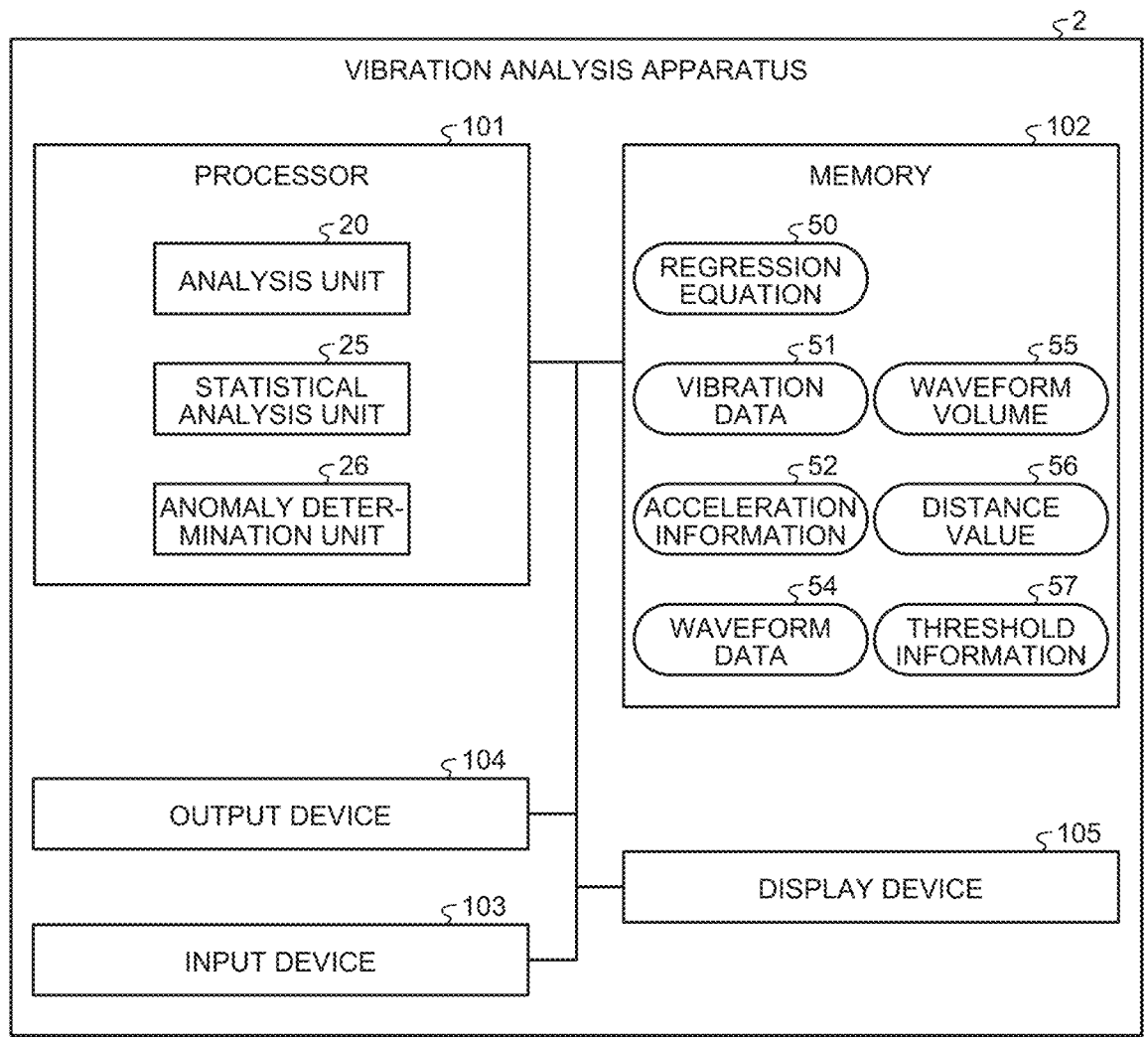
FIG. 9 is a diagram illustrating an exemplary hardware configuration that implements the vibration analysis apparatus according to the embodiment.

A hardware configuration of the vibration analysis apparatus 2 will be explained. FIG. 9 is a diagram illustrating an exemplary hardware configuration that implements the vibration analysis apparatus according to the embodiment.

The vibration analysis apparatus 2 can be implemented by a processor 101, a memory 102, an input device 103, an output device 104, and a display device 105. Examples of the processor 101 are a central processing unit (CPU) (also known as a processing device, a computing device, a microprocessor, a microcomputer, or a digital signal processor (DSP)) and a system large scale integration (LSI). Examples of the memory 102 are a random access memory (RAM) and a read-only memory (ROM).

The vibration analysis apparatus 2 is implemented by the processor 101 reading and executing a computer-executable vibration analysis program for performing operation of the vibration analysis apparatus 2 stored in the memory 102. It can also be said that the vibration analysis program that is a program for performing operation of the vibration analysis apparatus 2 causes a computer to perform a procedure and a method for the vibration analysis apparatus 2.

The vibration analysis program executed by the vibration analysis apparatus 2 has a module configuration that includes the analysis unit 20, the statistical analysis unit 25, and the anomaly determination unit 26, which are loaded on a main storage device and generated on the main storage device.

The input device 103 receives the vibration data 51 and sends the vibration data 51 to the processor 101. The memory 102 is used as a temporary memory in individual processing performed by the processor 101. Moreover, the memory 102 stores the regression equations 50, the vibration data 51, the acceleration information 52, the waveform data 54, the waveform volume 55, the distance value 56, the threshold information 57, and the like. The output device 104 outputs the determination result 58 to the control unit 12. The display device 105 is a device that displays the regression equations 50, the vibration data 51, the acceleration information 52, the waveform data 54, the waveform volume 55, the distance value 56, the threshold information 57, the determination result 58, and the like. The display device 105 is, for example, a liquid crystal monitor.

The vibration analysis program may be stored in a computer-readable storage medium in an installable or executable file and provided as a computer program product. Alternatively, the vibration analysis program may be provided to the vibration analysis apparatus 2 via a network such as the Internet. Some of the functions of the vibration analysis apparatus 2 may be implemented by dedicated hardware such as a dedicated circuit, and others may be implemented by software or firmware.

As described above, according to the embodiment, the vibration analysis apparatus 2 specifies the regression equation 50 corresponding to an acceleration peak and tracks, in accordance with the specified regression equation 50, a change in the peak occurrence frequency due to a change in the rotation speed when vibrations of the rotation mechanism 10 are analyzed. The vibration analysis apparatus 2 calculates the waveform area for each acceleration peak while tracking the change in the peak occurrence frequency; therefore, the vibration analysis apparatus 2 can detect the operational anomaly of the rotation mechanism 10 in which the rotation speed changes.

The configurations presented in the embodiments above are examples, and can be combined with other known technologies or can be partly omitted or modified without departing from the scope.

REFERENCE SIGNS LIST 1 manufacturing apparatus; 2 vibration analysis apparatus; 10 rotation mechanism; 11 vibration sensor; 12 control unit; 20 analysis unit; 21 conversion unit; 22 waveform cutout unit; 23 volume calculation unit; 24 storage unit; 25 statistical analysis unit; 26 anomaly determination unit; 27 display unit; 50 regression equation; 51 vibration data; 52 acceleration information; 54 waveform data; 55 waveform volume; 56 distance value; 57 threshold information; 58 determination result; 100 vibration analysis system; 101 processor; 102 memory; 103 input device; 104 output device; 105 display device; AR1 to AR6 acceleration peak.

The invention claimed is:

1. A vibration analysis apparatus comprising:
a memory to store first correspondence information indicating a correspondence between a change in a first rotation speed of a rotation mechanism and a change in a first vibration frequency corresponding to a first acceleration peak of acceleration of vibration in the rotation mechanism, for each first acceleration peak in a plurality of acceleration peaks used for calculation of a regression equation;
analysis circuitry to extract a second vibration frequency corresponding to a second acceleration peak of acceleration of vibration for each second acceleration peak in a plurality of acceleration peaks used for detecting an operational anomaly of the rotation mechanism, on a basis of vibration data indicating vibration of the rotation mechanism when vibration of the rotation mechanism is analyzed, and to calculate, for each second acceleration peak, a waveform area that is an area of a waveform of the second acceleration peak by integrating the second acceleration peak over a specific frequency section; and
anomaly determination circuitry to determine whether the operational anomaly occurs in the rotation mechanism for each second acceleration peak on a basis of the waveform area and a threshold for a corresponding second acceleration peak, wherein
the analysis circuitry identifies the first correspondence information stored in the memory that corresponds to the second acceleration peak based on the regression equation, tracks, in accordance with the first correspondence information identified, a change in the second vibration frequency due to a change in a second rotation speed when vibration of the rotation mechanism is analyzed, and calculates, for each second acceleration peak, the waveform area of the second acceleration peak corresponding to the second vibration frequency tracked.

2. The vibration analysis apparatus according to claim 1, wherein
the analysis circuitry calculates second correspondence information indicating a correspondence between the second vibration frequency and the second acceleration peak by performing fast Fourier transform on the vibration data, and extracts the second acceleration peak and the second vibration frequency on a basis of the second correspondence information.

3. The vibration analysis apparatus according to claim 1, wherein
the analysis circuitry calculates a volume of the waveform of the second acceleration peak as a waveform volume by integrating the waveform area over a specific period of time, and
the anomaly determination circuitry determines whether an operational anomaly occurs in the rotation mechanism for each second acceleration peak on a basis of a result of comparison between the waveform volume and the threshold.

4. The vibration analysis apparatus according to claim 1, wherein
the analysis circuitry calculates an average value of the waveform area in a specific period of time as an area average value, and
the anomaly determination circuitry determines whether an operational anomaly occurs in the rotation mechanism for each second acceleration peak on a basis of a result of comparison between the area average value and the threshold.

5. The vibration analysis apparatus according to claim 1, wherein
the anomaly determination circuitry determines whether an operational anomaly occurs in the rotation mechanism for each second acceleration peak by a statistical diagnosis method based on a feature quantity of vibration when the rotation mechanism is in a normal condition and a feature quantity of vibration when vibration of the rotation mechanism is analyzed.

6. The vibration analysis apparatus according to claim 1, wherein
the anomaly determination circuitry determines whether an operational anomaly occurs in the rotation mechanism for each second acceleration peak on a basis of whether the second acceleration peak is within an allowable range.

7. The vibration analysis apparatus according to claim 1, further comprising a display to display the waveform of the second acceleration peak and the waveform area.

8. A vibration analysis method comprising:
storing, in a memory, first correspondence information indicating a correspondence between a change in a first rotation speed of a rotation mechanism and a change in a first vibration frequency corresponding to a first acceleration peak of acceleration of vibration in the rotation mechanism, for each first acceleration peak in a plurality of acceleration peaks used for calculation of a regression equation;
analyzing, using circuitry, by extracting a second vibration frequency corresponding to a second acceleration peak of acceleration of vibration for each second acceleration peak in a plurality of acceleration peaks used for detecting an operational anomaly of the rotation mechanism, on a basis of vibration data indicating vibration of the rotation mechanism when vibration of the rotation mechanism is analyzed, and calculating, for each second acceleration peak, a waveform area that is an area of a waveform of the second acceleration peak by integrating the second acceleration peak over a specific frequency section; and
determining, using the circuitry, whether an operational anomaly occurs in the rotation mechanism for each second acceleration peak on a basis of the waveform area and a threshold for a corresponding second acceleration peak, wherein
the analyzing further includes identifying the first correspondence information stored in the memory that corresponds to the second acceleration peak based on the regression equation, tracking, in accordance with the first correspondence information identified, a change in the second vibration frequency due to a change in a second rotation speed when vibration of the rotation mechanism is analyzed, and calculating, for each second acceleration peak, the waveform area of the second acceleration peak corresponding to the second vibration frequency tracked.

9. The vibration analysis apparatus according to claim 1, wherein the regression equation represents a correspondence between a number of rotations and a peak occurrence frequency.

10. The vibration analysis method according to claim 8, wherein the regression equation represents a correspondence between a number of rotations and a peak occurrence frequency.

\* \* \* \* \*